(12) United States Patent
Hokazono et al.

(10) Patent No.: US 6,950,236 B2
(45) Date of Patent: *Sep. 27, 2005

(54) ANTIREFLECTION FILM, POLARIZING PLATE, AND APPARATUS FOR DISPLAYING AN IMAGE

(75) Inventors: Hirohisa Hokazono, Kanagawa (JP); Kazuhiro Nakamura, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 3 days.

This patent is subject to a terminal disclaimer.

(21) Appl. No.: 10/473,420

(22) PCT Filed: Apr. 9, 2002

(86) PCT No.: PCT/JP02/03544

§ 371 (c)(1), (2), (4) Date: Sep. 30, 2003

(87) PCT Pub. No.: WO02/084338

PCT Pub. Date: Oct. 24, 2002

(65) Prior Publication Data

US 2004/0114248 A1 Jun. 17, 2004

(30) Foreign Application Priority Data

Apr. 10, 2001 (JP) .......... 2001-111589
Aug. 7, 2001 (JP) .......... 2001-239316

(51) Int. Cl.[7] .................. G02B 1/10
(52) U.S. Cl. .......... 359/586; 359/587; 359/589; 428/212; 349/137
(58) Field of Search .......... 359/586, 587, 359/582, 589, 603, 883; 428/212, 220; 349/137

(56) References Cited

U.S. PATENT DOCUMENTS

| 5,015,523 A | 5/1991 | Kawashima et al. |
| 2003/0021972 A1 * | 1/2003 | Choi et al. .......... 428/212 |
| 2003/0147140 A1 * | 8/2003 | Ito .......... 359/599 |

FOREIGN PATENT DOCUMENTS

| EP | 0 953 550 A1 | 11/1999 |
| EP | 1 089 093 A2 | 4/2001 |

* cited by examiner

Primary Examiner—Fayez G. Assaf
(74) Attorney, Agent, or Firm—Burns, Doane, Swecker & Mathis, LLP (57) ABSTRACT

An antireflection film having a low reflectance and giving non-tinged reflected light with a low cost, which comprises: a transparent substrate; and a low-refractive layer having a lower refractive index than said transparent substrate, wherein the antireflection film has an average specular reflectance of 0.5% or less at an incidence angle of 5° in a wavelength region of from 450 to 650 nm, and, when CIE standard illuminant $D_{65}$ in a wavelength region of from 380 to 780 nm is incident on the antireflection film at an incidence angle of 5°, the regular reflection light has a color having a* and b* values in a ranges specified by $-7 \leq a^* \leq 7$ and $-10^* \leq b^* \leq 10$ in the CIE 1976 L*a*b* color space.

28 Claims, 3 Drawing Sheets

ANTIREFLECTION FILM, POLARIZING PLATE, AND APPARATUS FOR DISPLAYING AN IMAGE

TECHNICAL FIELD

This invention relates to an antireflection film, a polarizing plate using the same, and an apparatus for displaying an image using the antireflection film or the polarizing plate.

BACKGROUND ART

An antireflection film is used in various image displays, such as liquid crystal displays (LCDs), plasma display panels (PDPs), electroluminescence displays (ELDs), and cathode ray tube displays (CRTs). The antireflection film is used in an eyeglass and camera.

Multilayer antireflection films having a stack of thin transparent metal oxide layers have been commonly employed. Use of a plurality of transparent layers is for preventing reflection of light in as broad a wavelength range as possible in the visible region. Thin transparent metal oxide films are formed by chemical vapor deposition (CVD) or physical vapor deposition (PVD), particularly vacuum deposition or sputtering that are categorized as PVD techniques. While thin transparent metal oxide films possess excellent optical properties as an antireflection coat, vacuum deposition and sputtering used for forming these films achieve low productivity and are unfit for large-volume production.

Methods of forming an antireflection film by wet coating with inorganic particles have been proposed as a substitute for vapor deposition techniques. For example, JP-B-60-59250 discloses an antireflection layer containing a particulate inorganic substance and having microvoids, which is obtained by coating. The antireflection layer having microvoids is obtained by applying a coating composition and treating the coating layer with activated gas.

JP-A-59-50401 discloses an antireflection film comprising a substrate having formed thereon a high-refractive layer and a low-refractive layer in this order. The antireflection film can further comprise a medium-refractive layer between the substrate and the high-refractive layer. The low-refractive layer is formed by applying a polymer or inorganic particles by wet coating.

JP-A-2-245702 discloses an antireflection film containing two or more kinds of ultrafine particles (e.g., $MgF_2$ and $SiO_2$). The mixing ratio of the particles are varied in the film thickness direction to vary the refractive index thereby achieving optical properties similar to those of the antireflection film of JP-A-59-50401 having a high-refractive layer/low-refractive layer combination. The ultrafine particles are bound by $SiO_2$ resulting from thermal decomposition of ethyl silicate. Thermal decomposition of ethyl silicate is accompanied by combustion of the ethyl moiety to generate carbon dioxide and steam, which release from the coating layer to leave interstices among the ultrafine particles as shown in FIG. 1 of the publication.

JP-A-5-13021 proposes filling the above-described interstices among ultrafine particles with a binder. JP-A-7-48527 discloses an antireflection film containing a particulate inorganic substance comprising porous silica and a binder.

JP-A-11-6902 teaches an all-wet coating technique for making an antireflection film with high film strength and low reflection at low cost, disclosing a film having a three-layered antireflection layer formed by wet coating, in which at least two inorganic particles are stacked on a low-refractive layer to form a layer containing microvoids.

On the other hand, known means for imparting antiglare properties to an antireflection film formed by a wet coating technique include coating a substrate having surface unevenness with an antireflection layer, incorporating matting particles for making surface unevenness into an antireflection layer, and embossing a smooth antireflection film to form surface unevenness, as described in JP-A-2000-275401 and JP-A-2000-275404.

An antireflection film formed by vacuum deposition or sputtering which has an average reflectance of 0.4% or lower in a wavelength region of 450 to 650 nm gives reflected light strongly tinged in reddish to bluish purple. Where a light source is behind a viewer, such tinged reflected light impairs display quality. On the other hand, an antireflection film formed by wet coating, while having reflected light of nearly neutral color, has an average reflectance more than 1%, which is insufficient particularly in applications where outside light is incident directly on the display face. Example 24 of JP-A-11-6902 supra reads that the film formed by wet coating had an average reflectance of 0.35%. However, the reflected light from the film turned out to assume an intense reddish purple color as calculated from the reflection spectrum. A sample actually prepared by the present inventors according to the disclosure was found to have reflected light intensely colored in reddish purple when observed with the naked eye, which ruins the display quality.

An object of the present invention is to provide an antireflection film having a low reflectance and giving non-tinged reflected light.

Another object of the invention is to provide a polarizer having the antireflection film and an apparatus for displaying an image using the antireflection film or the polarizer.

DISCLOSURE OF THE INVENTION

The above objects of the invention are accomplished by the antireflection films, polarizing plates, and image displays listed below.

(1) An antireflection film comprising:

a transparent substrate; and a low-refractive layer having a lower refractive index than said transparent substrate, wherein the antireflection film has an average specular reflectance of 0.5% or less at an incidence angle of 5° in a wavelength region of from 450 to 650 nm, and, when CIE standard illuminant $D_{65}$ in a wavelength region of from 380 to 780 nm is incident on the antireflection film at an incidence angle of 5°, the regular reflection light has a color having a* and b* values in a ranges specified by $-7 \leq a^* \leq 7$ and $-10 \leq b^* \leq 10$ in the CIE 1976 L*a*b* color space.

(2) The antireflection film according to the above item (1), wherein said regular reflection light has a* and b* values in the ranges specified by $0 \leq a^* \leq 5$ and $-10 \leq b^* \leq 10$.

(3) The antireflection film according to the above item (1) or (2), wherein said average specular reflectance at an incidence angle of 5° in a wavelength region of from 450 to 650 nm is 0.4% or less.

(4) The antireflection film according to any one of the above items (1) to (3), wherein said average specular reflectance at an incidence angle of 5° in a wavelength region of from 450 to 650 nm is 0.3% or less.

(5) The antireflection film according to any one of the above items (1) to (4), wherein a layer constituting said antireflection film is a layer formed by applying a coating composition comprising a film-forming solute and at least one solvent, drying the coating film to remove the solvent, and curing the coating film by applying at least one of a heat and an ionizing radiation.

(6) The antireflection film according to the above item (5), which has a substantially three-layered structure comprising a medium-refractive layer, a high-refractive layer, and said low-refractive layer, in the order from the substrate side, wherein the high-refractive layer has a higher refractive index than said transparent substrate, and the medium-refractive layer has a refractive index higher than that of said transparent substrate and lower than that of said high-refractive layer.

(7) The antireflection film according to the above item (6), wherein said medium-refractive layer, said high-refractive layer, and said low-refractive layer satisfy formulae (I), (II), and (III), respectively, at a designed wavelength $\lambda$ (=500 nm):

$$l\lambda/4 \times 0.80 < n_1 d_1 < l\lambda/4 \times 1.00 \quad (I)$$

$$m\lambda/4 \times 0.75 < n_2 d_2 < m\lambda/4 \times 0.95 \quad (II)$$

$$n\lambda/4 \times 0.95 < n_3 d_3 < n\lambda/4 \times 1.05 \quad (III)$$

wherein l is 1; $n_1$ is the refractive index of the medium-refractive layer; $d_1$ is the thickness (nm) of the medium-refractive layer; m is 2; $n_2$ is the refractive index of the high-refractive layer; $d_2$ is the thickness (nm) of the high-refractive layer; n is 1; $n_3$ is the refractive index of the low-refractive layer; $d_3$ is the thickness (nm) of the low-refractive layer.

(8) The antireflection film according to any one of the above items (5) to (7), wherein said low-refractive layer comprises a fluorine-containing resin capable of curing by at least one of a heat and an irradiation of an ionizing radiation.

(9) The antireflection film according to the above item (6) or (7), wherein said high-refractive layer is a layer formed by:

applying a coating composition comprising:

ultrafine particles containing at least one metal oxide selected from oxides of titanium, zirconium, indium, zinc, tin and antimony;

an anionic dispersant;

a curing resin having at least three-functional polymerizable group;

a polymerization initiator; and a solvent, drying the coating film to remove the solvent; and curing the coating film by applying at least one of a heat and an ionizing radiation.

(10) The antireflection film according to the above item (8), wherein said low-refractive layer has a kinetic friction coefficient of 0.15 or smaller and a contact angle of 100° or greater with water.

(11) The antireflection film according to any one of the above items (1) to (10), which further comprises at least one hard coat layer between said low-refractive layer and said transparent substrate.

(12) The antireflection film according to any one of the above items (1) to (11), which further comprises at least one forward-scattering layer between said low-refractive layer and said transparent substrate.

(13) The antireflection film according to any one of the above items (1) to (12), wherein, when CIE standard illuminant $D_{65}$ in a wavelength region of from 380 to 780 nm is incident on the antireflection film at an incidence angle of 5°, the regular reflection light shows a color difference of less than 2 in terms of a $\Delta \text{Eab}^*$ value in the CIE 1976 $L^*a^*b^*$ color space between two arbitrary points 10 cm apart in one of the machine direction (MD) and the transverse direction (TD).

(14) A polarizing plate comprising a polarizer and at least two surface protective films, in which each of the at least two protective films is adhered to both sides of said polarizer, wherein at least one of said protective films is the antireflection film described in any one of the above items (1) to (13), said antireflection film having been immersed in an alkali solution at least once to saponify the back surface of said antireflection film after the formation of the low-refractive layer.

(15) A polarizing plate comprising a polarizer and at least two surface protective films, in which each of at least two protective films is adhered to both sides of said polarizer, wherein at least one of said protective films is the antireflection film described in any one of the above items (1) to (14), said antireflection film being prepared by: coating the back side of the antireflection film opposite to the side on which the low-refractive layer is to be formed with an alkali solution, either before or after formation of said low-refractive layer; heating said coated antireflection film, followed by at least one of washing with water and a neutralization thereby to saponify only the back side of said antireflection film.

(16) A polarizing plate according to the above item (14) or (15), wherein the surface protective film other than the antireflection film is an optical compensation film having, on the side opposite to said polarizer, an optical compensation layer comprising an optically anisotropic layer, said optically anisotropic layer being a negative birefringence layer comprising a compound having a discotic structural unit, in which the disc of said discotic structural unit tilts with respect to the plane of said protective film at an angle varying in the thickness direction of said optically anisotropic layer.

(17) A transmission, reflection or semi-transmission type liquid crystal display in a twisted nematic mode, a supertwisted nematic mode, a vertical alignment mode, an in-plane switching mode or an optical compensated bend cell mode, which comprises at least one polarizing plate described in any one of the above items (14) to (16).

(18) A transmission or semi-transmission type liquid crystal display, which comprises at least one polarizing plate described in any one of the above items (14) to (16), wherein a polarized light splitting film having a polarized light selecting layer is disposed between a backlight and a polarizing plate which is disposed on the opposite side to the viewer's side.

(19) The antireflection film according to any one of the above items (1) to (13), wherein said transparent substrate is one of a polyethylene terephthalate film, a polyethylene naphthalate film and a cellulose triacetate film.

(20) A surface protective plate for an organic electroluminescence display, which comprises the polarizing plate described in any one of the above items (14) to (16) and a $\lambda/4$ plate, wherein the $\lambda/4$ plate is disposed on a transparent protective film opposite to the antireflection film side.

The another preferable embodiments of the present invention are set forth below.

(21) The antireflection film according to any one of the above items (1) to (13), which further comprises an adhesive layer which is in contact with the lower side of said low-refractive later, wherein a surface of said adhesive layer has a center-line average roughness (Ra) of 0.001 to 0.030 $\mu$m.

(22) The antireflection film according to the above item (21), wherein the surface of said adhesive layer has a center-line average roughness (Ra) of 0.005 to 0.020 μm.

(23) The antireflection film according to the above item (21) or (22), wherein the adhesive layer comprises: inorganic particles having an average particle size of 0.001 to 0.2 μm; and an organic binder, and the adhesive layer has voids among the particles.

(24) The antireflection film according to the above items (1) to (13), which further comprises an adhesive layer which is in contact with the low-refractive layer, wherein the adhesive layer comprises: inorganic particles having an average particle size of 0.001 to 0.2 μm; and an organic binder, and the adhesive layer has voids among the particles.

(25) An antireflection film according to the above item (23) or (24), wherein the inorganic particles has a polymerizable functional group on its surface, and the organic binder is a monomer copolymerizable with the polymerizable functional group on the inorganic particles.

(26) The antireflection film according to any one of the items (21) to (25), which further comprises a hard coat layer having a thickness of 1 μm or greater between said adhesive layer and said transparent substrate, wherein said adhesive layer is an adhesive and high-refractive layer having a higher refractive index than said transparent substrate.

(27) The antireflection film according to the above item (26), which further comprises a medium-refractive layer between said adhesive and high-refractive layer and said hard coat layer, wherein said medium-refractive layer has a refractive index higher than that of said low-refractive layer and lower than that of said adhesive and high-refractive layer.

(28) The antireflection film according to the above item (26) or (27), which is an antiglare antireflection film wherein the hard coat layer has a refractive index of 1.57 to 2.00 and contains matting particles having an average particle size of 0.3 to 20 μm.

(29) The antireflection film according to any one of the above items (21) to (28), which is an antiglare antireflection film wherein the adhesive layer has a thickness of 1 μm or greater and a refractive index of 1.57 to 2.00 and contains matting particles having an average particle size of 0.3 to 20 μm.

(30) The antireflection film according to any one of the above items (21) to (29), wherein said low-refractive layer includes a fluorine-containing compound capable of crosslinking by one of a heat and an irrdiation with an ionizing radiation, and said low-refractive layer has: a refractive index of 1.35 to 1.49; a kinetic friction coefficient of 0.03 to 0.15; and a contact angle of 90 to 120° with water.

(31) The antireflection film according to any one of the above items (21) to (30), wherein the transparent substrate is a cellulose triacetate film.

(32) A polarizing plate having on at least one side thereof the antireflection film described in any one of (21) to (31).

(33) An apparatus for displaying an image, which comprising at least one of the antireflection film described in any one of (21) to (31) and the polarizing plate described in the item (32).

(34) The apparatus for displaying an image according to the item (33), wherein the at least one of the antireflection film and the polarizing plate is provided so that the low-refractive layer is the outermost layer of the display.

Figure 1:
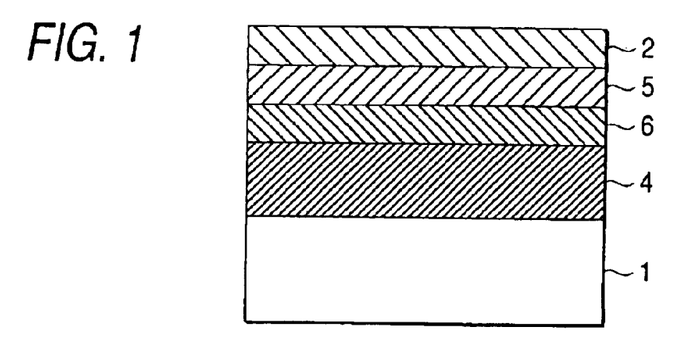
FIG. 1 is a schematic cross section showing the basic layer structure of the antireflection film of the present invention.

The reference numbers in the figure are as follows.
0: an adhesive layer
1: a transparent substrate
2: a low-refractive layer
4: a hard coat layer
5: a high-refractive layer
6: a medium-refractive layer
40: an adhesive and hard coat layer
50: an adhesive and high-refractive layer A basic layer structure of the antireflection film according to the present invention is shown in FIG. 1. The structure shown in FIG. 1 has a transparent substrate (1), a hard coat layer (4), a medium-refractive layer (6), a high-refractive layer (5), and a low-refractive layer (2) in this order. In the case with such a three-layered antireflection layer, it is taught in JP-A-59-50401 that the optical thickness of each layer, i.e., the product of the refractive index and the film thickness, is preferably about nλ/4, wherein λ is a designed wavelength, or a multiple of about nλ/4.

Figure 2:
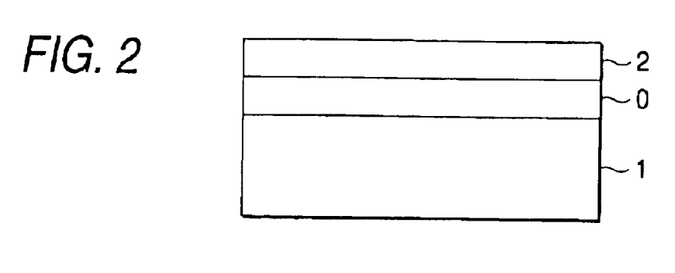
FIG. 2 is a schematic cross section showing another structure of an antireflection film.

The antireflection film of FIG. 2, which is another embodiment of the present invention, has a transparent substrate (1), an adhesive layer (0), and a low-refractive layer (2) in this order.

Figure 3:
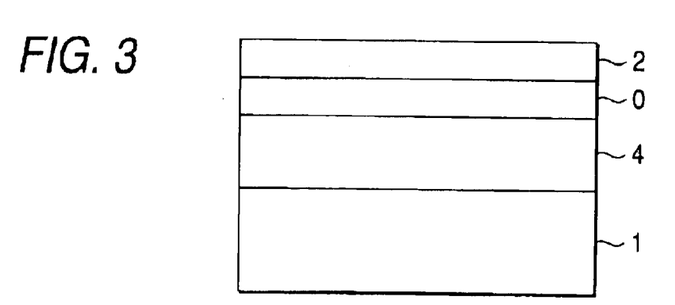
FIG. 3 is a schematic cross section showing the structure of another antireflection film.
Figure 4:
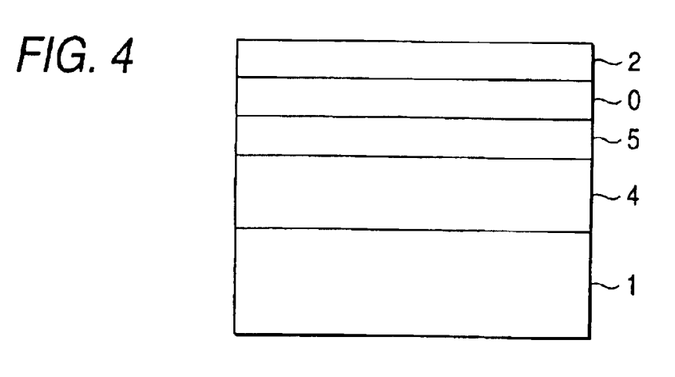
FIG. 4 is a schematic cross section showing the structure of another antireflection film.
Figure 5:
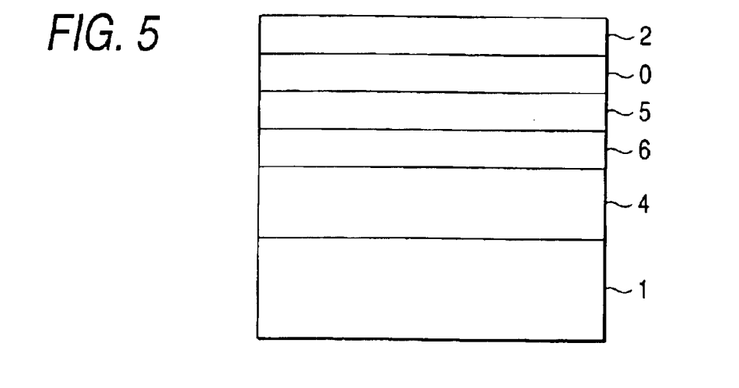
FIG. 5 is a schematic cross section showing the structure of another antireflection film.

The antireflection film shown in FIG. 3, which is another embodiment of the present invention, has a transparent substrate (1), a hard coat layer (4), an adhesive layer (0), and a low-refractive layer (2) in this order. The antireflection film of FIG. 4, which is another embodiment of the present invention, has a transparent substrate (1), a hard coat layer (4), a high-refractive layer (5), an adhesive layer (0), and a low-refractive layer (2) in this order. The antireflection film of FIG. 5, which is another embodiment of the present invention, has a transparent substrate (1), a hard coat layer (4), a medium-refractive layer (6), a high-refractive layer (5), an adhesive layer (0), and a low-refractive layer (2) in this order.

Figure 6:
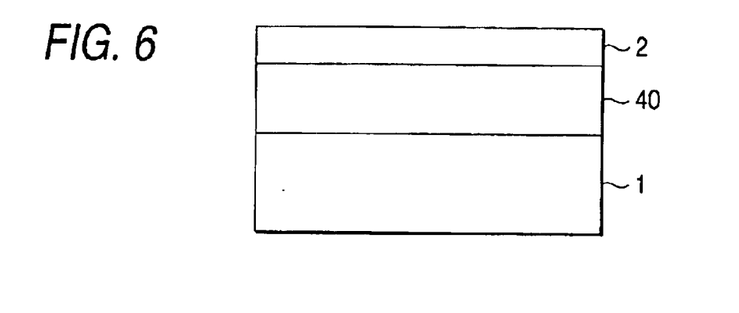
FIG. 6 is a schematic cross section showing the structure of another antireflection film.
Figure 7:
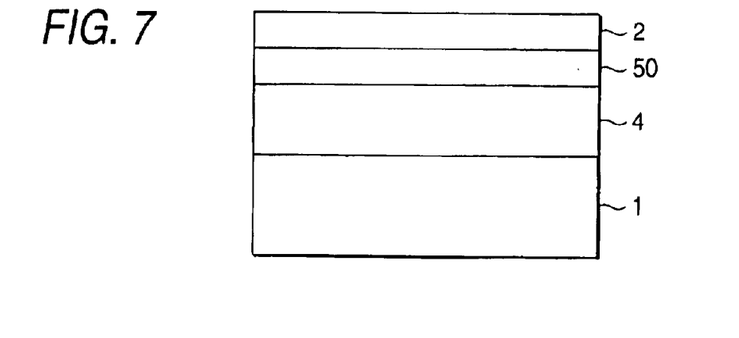
FIG. 7 is a schematic cross section showing the structure of another antireflection film.
Figure 8:
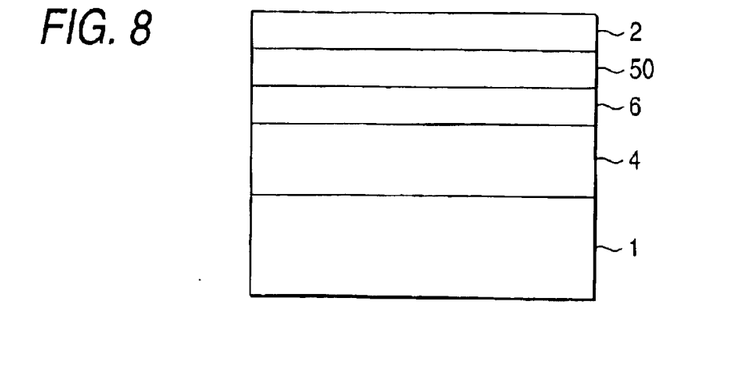
FIG. 8 is a schematic cross section showing the structure of another antireflection film.

The antireflection film of FIG. 6, which is another embodiment of the present invention, has a transparent substrate (1), an adhesive and hard coat layer (40), and a low-refractive layer (2) in this order. The antireflection film of FIG. 7, which is another embodiment of the present invention, has a transparent substrate (1), a hard coat layer (4), an adhesive and high-refractive layer (50), and a low-refractive layer (2) in this order. The antireflection film of FIG. 8, which is another embodiment of the present invention, has a transparent substrate (1), a hard coat layer (4), a medium-refractive layer (6), an adhesive and high-refractive layer (50), and a low-refractive layer (2) in this order.

The above-mentioned layer structure enables accomplishing both low reflection and reduction of reflected light coloring. As a result, the antireflection film of the invention applied as an outermost layer of a display provides a display, such as an LCD, with high visibility not heretofore attained. Having an average specular reflectance of not more than 0.5% at an incidence angle of 5° in a wavelength region of from 450 nm to 650 nm, the antireflection film satisfactorily prevents reduction in visibility due to reflection of outside light on the display faceplate. Since the color of the regular reflection light of a CIE standard source illuminant $D_{65}$ in a wavelength region of from 380 nm to 780 nm at an incidence angle of 5° is within a range specified by $-7 \leq a^* \leq 7$ and $-10 \leq b^* \leq 10$ according to CIE 1976 $L^*a^*b^*$ color space system, the antireflection film of the invention is free from the reddish to bluish purple coloring of reflected light that has been a problem associated with conventional multilayer antireflection film. Where the reflected light has $a^*$ and $b^*$ values in the ranges specified by $0 \leq a^* \leq 5$ and $-10 \leq b^* \leq 10$, the coloring of the reflected light is greatly reduced. In applications to LCDs, the color of reflected light caused by reflection of outer light having high brightness, such as light from fluorescent tubes in a room, is neutral and negligible.

The average specular reflectance at an incidence angle of 5° in a wavelength region of from 450 nm to 650 nm and the color of regular reflection light of a CIE standard illuminant $D_{65}$ in a wavelength region of from 380 nm to 780 nm at an incidence angle of 5°, may be measured by a conventional method.

Reflected light having an $a^*$ value greater than 7 is strongly tinted with red, and that having an $a^*$ value smaller than $-7$ is strongly tinted with cyan. At a $b^*$ value smaller than $-7$ or greater than 0, reflected light has a strong bluish tint or a strong yellowish tint, respectively.

The present inventors have revealed that achieving more effectively both low reflection and reduction of reflected light coloration requires the medium-refractive layer, the high-refractive layer, and the low-refractive layer to fulfill formulae (I), (II) and (III) shown below, respectively, at a designed wavelength (=500 nm).

$$l\lambda/4 \times 0.80 < n_1 d_1 < l\lambda/4 \times 1.00 \quad \text{(I)}$$

$$m\lambda/4 \times 0.75 < n_2 d_2 < m\lambda/4 \times 0.95 \quad \text{(II)}$$

$$n\lambda/4 \times 0.95 < n_3 d_3 < n\lambda/4 \times 1.05 \quad \text{(III)}$$

wherein l is 1; $n_1$ is the refractive index of a medium-refractive layer; $d_1$ is the thickness (nm) of the medium-refractive layer; m is 2; $n_2$ is the refractive index of a high-refractive layer; $d_2$ is the thickness (nm) of the high-refractive layer; n is 1; $n_3$ is the refractive index of a low-refractive layer; and $d_3$ is the thickness (nm) of the low-refractive layer.

Where these three layers are provided on a transparent substrate having a refractive index of from 1.45 to 1.55, such as a cellulose triacetate substrate (refractive index: 1.49), it is required that n1 should be 1.60 to 1.65, n2 be 1.85 to 1.95, and n3 be 1.35 to 1.45. Where they are provided on a transparent substrate having a refractive index of from 1.55 to 1.70, such as a polyethylene terephthalate substrate (refractive index: 1.66), it is required that n1 be 1.65 to 1.75, n2 be 1.85 to 2.05, and n3 be 1.35 to 1.45. In case materials having a desired refractive index as a medium- or high-refractive layer are unavailable or unfit, a combination of a plurality of layers comprising a layer whose refractive index is higher than the desired one and a layer whose refractive index is lower than the desired one can be used to achieve substantial optical equivalence to a designed medium- or high-refractive layer as is well known in the art. The term "substantially three-layered structure" as used for the antireflection layer is intended to include an antireflection layer which contains such an optically equivalent layer and therefore can have a four- or five-layered structure.

As a result of the above-described great reduction in reflected light coloring, unevenness in the tint of reflected light attributed to thickness variation of the antireflection layer is also greatly reduced. In other words, the range of an allowable thickness variation is broadened, which leads to an increased production yield and a further reduced production cost. Unevenness in reflected light tint can be expressed quantitatively in terms of a color difference of the regular reflection light of CIE standard illuminant $D_{65}$ in a wavelength region between 380 nm and 780 nm at an incidence angle of 5° between two arbitrary points 10 cm apart in the machine direction (MD; the longitudinal direction of the substrate) or the transverse direction (TD; the direction perpendicular to the MD), the color difference being represented by a $\Delta Eab^*$ value in the CIE 1976 $L^*a^*b^*$ color space. The $\Delta Eab^*$ value is preferably smaller than 2, still preferably smaller than 1.5. A color difference $\Delta Eab^*$ less than 1.5 is imperceptible to human eyes.

The transparent substrate which can be used in the antireflection film of the invention preferably includes plastic films. Suitable polymers making the plastic films include cellulose esters (e.g., cellulose triacetate, cellulose diacetate, cellulose propionate, cellulose butyrate, cellulose acetate propionate, and nitrocellulose), polyamide, polycarbonate, polyesters (e.g., polyethylene terephthalate, polyethylene naphthalate, poly-1,4-cyclohexanedimethylene terephthalate, polyethylene 1,2-diphenoxyethane-4,4'-dicarboxylate, and polybutylene terephthalate), polystyrene (e.g., syndiotactic polystyrene), polyolefins (e.g., polypropylene, polyethylene, and polymethylpentene), polysulfone, polyether sulfone, polyarylate, polyetherimide, polymethyl methacrylate, and polyether ketone. Where the antireflection film is used as one of protective films of a polarizer in application to LCDs, organic ELDs, etc., cellulose triacetate is preferred. A cellulose triacetate substrate is preferably prepared by the process disclosed in Technical Disclosure Bulletin 2001-1745. In applications where the antireflection film is adhered to a faceplate made of glass or the like as in flat CRTs, PDPs, etc., polyethylene terephthalate or polyethylene naphthalate is preferably used.

It is desirable for the transparent substrate to have a light transmission of at least 80%, particularly 86% or higher, and a haze of not more than 2.0%, particularly 1.0% or less, and a refractive index of 1.4 to 1.7.

The thickness of the transparent substrate is preferably, but not limited to, 30 to 150 $\mu$m, still preferably 70 to 120 $\mu$m.

The medium-refractive and the high-refractive layers are formed by applying a coating composition comprising inorganic particles having a high refractive index, a heat- or ionizing radiation-curing monomer, a polymerization initiator, and a solvent, drying the coating film to remove the solvent, and curing the coating film by heat and/or ionizing radiation application. The inorganic particles are preferably particles of at least one metal oxide selected from oxides of titanium, zirconium, indium, zinc, tin, and antimony. The medium- and the high-refractive layers thus formed are superior in scratch resistance and adhesion to those formed by applying a polymer solution having a high refractive index and drying the coating film. It is preferred to add to a coating composition a polyfunctional (meth)acrylate monomer and an anionic group-containing (meth)acrylate dispersant as taught in JP-A-11-153703and U.S. Pat. No. 6,210,858 to improve dispersion stability and strength of a cured film.

The inorganic particles preferably have an average particle size of 1 to 100 nm as measured with a Coulter counter. Smaller particles than 1 nm have too large a specific surface area to assure sufficient stability in a dispersion. Greater particles than 100 nm can cause visible light to be scattered due to the difference from the binder in refractive index. The haze of the medium- and the high-refractive layers is preferably 3% or less, still preferably 1% or less.

The low-refractive layer preferably includes a fluorine-containing compound curable on heat or ionizing radiation application. The low-refractive layer preferably has a coefficient of kinetic friction of 0.03 to 0.15 and a contact angle of 100 to 120° with water. With a kinetic friction coefficient greater than 0.15, the layer easily receives scratches when rubbed. With a water contact angle smaller than 100°, the layer has poor resistance to contamination with fingerprints or oily soils.

The heat- or ionizing radiation-curing fluorine-containing compound includes a perfluoroalkyl-containing silane compound (e.g., (heptadecafluoro-1,1,2,2-tetradecyl) triethoxysilane)) and a fluorine-containing copolymers comprising a fluorine-containing monomer and a monomer providing a crosslinkable group.

Fluorine-containing monomers providing the fluorine-containing polymers include fluoroolefins, e.g., fluoroethylene, vinylidene fluoride, tetrafluoroethylene, hexafluoroethylene, hexafluoropropylene, and perfluoro-2,2-dimethyl-1,3-dioxonol; partially or completely fluorinated alkyl (meth)acrylates, e.g., Viscote 6FM available from Osaka Organic Chemical Industry Ltd. and M-2020 available from Daikin Industries, Ltd.; and partially or completely fluorinated vinyl ethers. Hexafluoropropylene is preferred of them for the low refractive index of the resulting polymer and ease of handling.

Monomers providing a crosslinkable group include (meth)acrylate monomers having a crosslinkable group in the molecule thereof, such as glycidyl methacrylate, and (meth)acrylate monomers having a carboxyl group, a hydroxyl group, an amino group, a sulfonic acid group, etc., such as (meth)acrylic acid, methylol (meth)acrylate, hydroxyalkyl (meth)acrylates, and allyl acrylate. The latter group of monomers, being known capable of introducing a crosslinked structure after copolymerization, are particularly preferred (see JP-A-10-25388 and JP-A-10-147739).

Comonomers which do not contain fluorine can be used in combination with the fluorine-containing monomers. Such comonomers include, but are not limited to, olefins (e.g., ethylene, propylene, isoprene, vinyl chloride, and vinylidene chloride), acrylic esters (methyl acrylate, ethyl acrylate, and 2-ethylhexyl acrylate), methacrylic esters (e.g., methyl methacrylate, ethyl methacrylate, butyl methacrylate, and ethylene glycol dimethacrylate), styrene derivatives (e.g., styrene, divinylbenzene, vinyltoluene, and α-methylstyrene), vinyl ethers (e.g., methyl vinyl ether), vinyl esters (e.g., vinyl acetate, vinyl propionate, and vinyl cinnamate), acrylamides (e.g., N-t-butylacrylamide and N-cyclohexylacrylamide), methacrylamides, and acrylonitrile derivatives. The details are disclosed in JP-A-10-25388 and JP-A-10-147739.

The fluorine-containing polymer can further comprise a comonomer unit serving for slip improvement and reduction of kinetic friction coefficient, which will lead to improved scratch resistance. For example, introduction of polydimethylsiloxane segment into the main chain as proposed in JP-A-11-228631 is preferably adopted.

It is preferred to disperse ultrafine particles of silicon oxide in the fluorine-containing polymer to improve scratch resistance. For the low-refractive layer to have a lower refractive index is better for antireflection, but scratch resistance reduces with a lowering refractive index. Therefore, the refractive index of the fluorine-containing polymer and the amount of the silicon oxide particles to be added are optimized to give the best balance between scratch resistance and low refractive index. Commercially available silica sol in an organic solvent or a prepared dispersion of commercially available silica powder in an organic solvent can be added to a coating composition for the low-refractive layer.

The ultrafine particles of oxide preferably have an average particle size of 0.001 to 0.2 μm, particularly 0.001 to 0.05 μm, and as narrow a size distribution (monodispersed) as possible. The ultrafine particles of oxide are suitably added in an amount of 5 to 90%, preferably 10 to 70%, still preferably 10 to 50%, by weight based on the total weight of the low-refractive layer.

The antireflection film of the present invention preferably comprises an adhesive layer which is in contact with the lower side of said low-refractive later, wherein a surface of said adhesive layer has a center-line average roughness (Ra) of 0.001 to 0.030 μm.

The adhesive layer which can be used in the present invention is a layer exhibiting excellent adhesion to both the upper layer and the lower layer. In the present invention, the upper layer (the layer provided directly on the adhesive layer) is a low-refractive material that generally has poor adhesion to another layer. The antireflection film of the invention exhibits very high resistance to scratches by virtue of this adhesion improving effect of the adhesive layer. The adhesive layer of the invention is characterized by having roughness on the surface thereof. The adhesive layer is considered to afford a good anchorage for the low-refractive layer to provide improved adhesion.

The adhesive layer preferably has a thickness of 0.001 to 0.030 μm, particularly 0.001 to 0.020 μm, especially 0.001 to 0.010 μm, so as not to influence the antireflection function based on optical interference. Where the refractive index of the adhesive layer is the same as that of the low-refractive layer (upper layer), the thickness of the adhesive layer is selected so that the total thickness of the adhesive layer and the low-refractive layer may be the thickness originally designed for a low-refractive layer. Where the refractive index of the adhesive layer is the same as that of the lower layer, it is conceivable that the thickness of the adhesive layer is selected so that the total thickness of the adhesive layer and the lower layer may be the thickness as originally designed for that lower layer. It is more desirable for the adhesive layer to take the place of the lower layer, namely to combine the function of the originally designed lower layer. That is, the adhesive layer can be an adhesive layer and high-refractive layer, an adhesive layer and hard coat layer or an adhesive layer and antiglare layer. In these cases, the thickness of the adhesive layer shall be what would have been designed for the respective functional layer.

The surface roughness of the adhesive layer is represented by a center-line average roughness (Ra) which is determined according to JIS B-0601. Ra is obtained by analyzing surface profile data measured with an atomic force microscope over an assessment length of 4 μm. Where the surface has antiglare unevenness attributed to matting particles as hereinafter described, the period of such unevenness is excluded from the data. The adhesive layer preferably has a center-line average roughness (Ra) of 0.001 to 0.1 μm, particularly 0.001 to 0.030 μm, especially 0.005 to 0.020 μm. Too small an Ra results in loss of the anchoring effect. Too great an Ra results in disturbance of the interface, which adversely affects the antireflection performance based on optical interference.

Materials which can make the adhesive layer with the above-recited Ra are not particularly limited. A preferred construction for obtaining the recited surface roughness is a two-component system composed of an organic binder and fine particles; the organic binder serving for securing adhesion to the lower layer and adhesive film strength, and the particles serving for producing surface unevenness. A preferred content of the particles is 20 to 95% by weight, particularly 50 to 95% by weight, based on the total weight of the adhesive layer. It is preferred for transparency that the particles be as fine as possible. A preferred volume average particle diameter is 0.001 to 0.2 μm, particularly 0.005 to 0.1 μm. The volume average particle diameter was determined by a kinetic light scatter method using a particle size analyzer N4 available from Beckman Coulter, Inc.

Inorganic particles are preferred to provide an adhesive layer with film strength. The shape of the inorganic particles is not particularly limited and includes spherical, tabular, fibrous, rod-like, amorphous or hollow shapes. Spherical particles are preferred for dispersibility. The material of the inorganic particles is not particularly limited, either. Amorphous materials are preferred. Metal oxides, nitrides, sulfides or halides are preferred, with metal oxides being particularly preferred. Useful metal species include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni.

The manner of using the inorganic particles is not particularly limited. For example, the particles can be added either in a dry state or as dispersed in water or an organic solvent.

For the purpose of suppressing agglomeration or sedimentation of the inorganic particles, it is preferred to use a dispersion stabilizer in combination. Useful dispersion stabilizers include polyvinyl alcohol, polyvinylpyrrolidone, cellulose derivatives, polyamide, phosphoric esters, polyether, surface active agents, silane coupling agents, and titanium coupling agents. Particularly preferred are silane coupling agents, which introduce functional groups copolymerizable with an organic binder to the surface of the inorganic particles thereby providing a strong cured film. For instance, vinyltrimethoxysilane, γ-methacryloxypropyltrimethoxysilane, etc. are effective for organic binders capable of curing through radical polymerization of a vinyl group; and γ-glycidyloxypropyltrimethoxysilane, etc. for organic binders capable of curing through cation polymerization of an epoxy group. While not limited, the silane coupling agent as a dispersion stabilizer is preferably added in an amount of at least 1 part by weight per 100 parts by weight of the inorganic particles. The silane coupling agent maybe hydrolyzed before addition, or the silane coupling agent may be mixed with the inorganic particles, followed by hydrolysis and condensation. The latter method of addition is preferred.

The organic binder to be used in the adhesive layer should provide excellent adhesion to the lower layer and have capability of forming a strong film. To meet these requirements, polymers having a saturated hydrocarbon or a polyether as a main chain are preferred. Polymers having a saturated hydrocarbon as a main chain are still preferred. It is also preferred for the binder polymers to have a crosslinked structure.

Of binder polymers having a saturated hydrocarbon as a main chain preferred are those comprising an ethylenically unsaturated monomer. Binder polymers having a saturated hydrocarbon chain as a main chain and a crosslinked structure include homo- or copolymers comprising a monomer having two or more ethylenically unsaturated groups per molecule. For obtaining a high-refractive adhesive layer it is preferred to use a monomer having two or more ethylenically unsaturated groups and an aromatic ring or at least one atom selected from halogens except fluorine, sulfur, phosphorus, and nitrogen.

Examples of the monomer having two or more ethylenically unsaturated groups include esters between polyhydric alcohols and (meth)acrylic acid, such as ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate; vinylbenzene and its derivatives, such as 1,4-divinylbenzene, 2-acryloylethyl 4-vinybenzoate, and 1,4-divinylcyclohexanone; vinylsulfones (e.g., divinylsulfone), acrylamides (e.g., methylenebisacrylamide), and methacrylamides.

Examples of the monomers providing high-refractive binders are bis(4-methacryloylthiophenyl)sulfide, vinylnaphthalene, vinylphenyl sulfide, and 4-methacryloxyphenyl-4'-methoxyphenyl thioether.

The monomers having ethylenically unsaturated groups are polymerized by ionizing radiation or heat application in the presence of a photo radical initiator or a thermal radical initiator.

Binder polymers having a polyether as a main chain preferably include ring-opening polymers of polyfunctional epoxy compounds. Ring-opening polymerization of polyfunctional epoxy compounds can be conducted by ionizing radiation or heat application in the presence of a photo acid generator or a thermal acid generator.

A monomer having a crosslinkable functional group may be used in place of, or in addition to, the monomer having two or more ethylenically unsaturated group to introduce the crosslinkable functional group which reacts to introduce a crosslinked structure into a binder polymer. Crosslinkable functional groups include an isocyanate group, an epoxy group, an aziridine group, an oxazoline group, an aldehyde group, a carbonyl group, a hydrazine group, a carboxyl group, a methylol group, and an active methylene group. Vinylsulfonic acids, acid anhydrides, cyanoacrylate derivatives, melamine, etherified methylol compounds, esters, urethanes, and metal alkoxides such as tetramethoxysilane are also useful as a monomer for introducing a crosslinked structure. A functional group which develops crosslinkability after decomposition, such as a blocked isocyanate group, is usable as well. That is, the crosslinkable functional group may be either a ready-to-react one or one which shows reactivity as a result of decomposition. The binder polymers having the above-described crosslinkable functional group are heated after being applied as a film to form a crosslinked structure.

The voids in the adhesive layer are represented by a void volume (vol %), which is obtained by attributing the difference between the refractive index of the adhesive layer and that calculated based on the composition of the adhesive layer to air (refractive index: 1.00) contained in the adhesive layer. A void volume is also obtainable by observing a slice of the layer under a transmission electron microscope (TEM). The adhesive layer of the present invention preferably has a void volume of 0.5 to 30 vol %, particularly 1 to 25 vol %. The preferred lower limit of the void volume is a limit for securing the anchoring effect, and the preferred upper limit is a limit for securing adhesive layer strength.

Materials which can make the adhesive layer with the above-recited void volume are not particularly limited. A preferred construction for obtaining the recited void volume is a two-component system composed of an organic binder and fine particles; the organic binder serving for securing adhesion to the lower layer and adhesive layer strength, and the particles serving for making voids among themselves. A preferred content of the particles is 60 to 95% by weight, particularly 80 to 95% by weight. It is preferred for transparency that the particles be as fine as possible. A preferred volume average particle diameter is 0.001 to 0.2 $\mu$m, particularly 0.005 to 0.1 $\mu$m. The kinds of the organic binder and the particles used in this embodiment are the same as those described as for the embodiment in which the adhesive layer has a specific Ra.

If desired, the antireflection film can have a hard coat layer, a forward-scattering layer, an antistatic layer and/or a protective layer. A hard coat layer is provided to make the transparent substrate scratch-resistant. It also serves to enhance the adhesion between the transparent substrate and the upper layer. The hard coat layer is preferably formed by applying a coating composition comprising an oligomer of a polyfunctional acrylic monomer, a urethane acrylate, an epoxyacrylate, etc., a polymerization initiator, and a solvent, which can contain an inorganic filler, such as silica or alumina, drying the coating layer to remove the solvent, and curing the coating layer by applying heat and/or ionizing radiation.

The thickness of the hard coat layer is preferably 1 to 30 $\mu$m, still preferably 1 to 20 $\mu$m, particularly preferably 2 to 15 $\mu$m. The pencil hardness of the hard coat layer is preferably H or higher, still preferably 2 H or higher, particularly preferably 3 H or higher. The refractive index of the hard coat layer is preferably in a range of 1.45 to 2.0, particularly 1.5 to 1.8.

The hard coat layer can be an inorganic layer mainly comprising silicon dioxide, an organic layer comprising a polymer having a saturated hydrocarbon or a polyether as a main chain, or a hybrid layer comprising a mixture of an inorganic compound and an organic compound. A layer made of a polymer having a saturated hydrocarbon as a main chain is particularly preferred. The polymer preferably has a crosslinked structure. The polymer having a saturated hydrocarbon as a main chain is preferably prepared by polymerizing an ethylenically unsaturated monomer. Monomers having two or more ethylenically unsaturated groups are preferably used to provide a crosslinked binder polymer.

Examples of the monomer having two or more ethylenically unsaturated groups include esters between polyhydric alcohols and (meth)acrylic acid, such as ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth) acrylate, 1,2,3-cyclohexane tetramethacrylate, polyurethane polyacrylate, and polyester polyacrylate; vinylbenzene and its derivatives, such as 1,4-divinylbenzene, 2-acryloylethyl 4-vinybenzoate, and 1,4-divinylcyclohexanone); vinylsulfones (e.g., divinylsulfone), acrylamides (e.g., methylenebisacrylamide), and methacrylamides.

The monomers having ethylenically unsaturated groups are cured by ionizing radiation- or heat-induced polymerization after wet coating.

The polymers having polyether as a main chain are preferably synthesized by ring-opening polymerization of polyfunctional epoxy compounds.

In place of, or in addition to, the monomer having two or more ethylenically unsaturated group, a monomer having a crosslinkable functional group may be used to introduce a crosslinked structure into a binder polymer. Crosslinkable functional groups include an isocyanate group, an epoxy group, an aziridine group, an oxazoline group, an aldehyde group, a carbonyl group, a hydrazine group, a carboxyl group, a methylol group, and an active methylene group. Vinylsulfonic acids, acid anhydrides, cyanoacrylate derivatives, melamine, etherified methylol compounds, esters, urethanes, and metal alkoxides such as tetramethoxysilane are also useful as a monomer for introducing a crosslinked structure. Compounds having a functional group which develops crosslinkability as a result of decomposition, such as compounds having a blocked isocyanate group, are usable as well. The binder polymers having the above-described crosslinkable functional group are crosslinked by heat application or the like after wet coating in a film.

The hard coat layer can contain inorganic particles to adjust the refractive index or to increase the film strength. Inorganic particles having an average particle size of 0.001 to 0.5 $\mu$m, particularly 0.001 to 0.2 $\mu$m, are preferably used. Suitable inorganic particles are particles of silicon dioxide, titanium dioxide, aluminum oxide, tin oxide, calcium carbonate, barium sulfate, talc, kaolin and calcium sulfate. Particles of silicon dioxide, titanium dioxide and aluminum oxide are particularly preferred.

The inorganic particles are preferably added in an amount of 10 to 90%, particularly 20 to 80%, especially 30 to 60%, by weight based on the hard coat layer.

The forward-scattering layer is provided in application to LCDs for the purpose of widening the viewing angle in both vertical and horizontal directions. The above-described hard coat layer which contains fine particles having different refractive indices can perform the function as a forward-scattering layer.

Where the multilayer antireflection film of the invention which is formed by wet coating is provided with surface unevenness to exhibit antiglare properties (to blur reflection of a viewer's background), it is more advisable to make surface unevenness by embossing the antireflection layer formed on the substrate than forming the antireflection layer on a layer with surface unevenness which contains matting particles, etc. The former method achieves better uniformity of film thickness, leading to improved antireflection performance.

Each layer constituting the antireflection layer can be formed by various wet coating techniques, such as dip coating, air knife coating, curtain coating, roller coating, wire bar coating, gravure coating, microgravure coating, and extrusion coating (see U.S. Pat. No. 2,681,294). Microgravure coating and gravure coating are preferred for minimizing the spread and thereby reducing drying unevenness. Gravure coating is preferred for assuring thickness uniformity in the cross direction. Two or more layers can be formed simultaneously. For simultaneous coating, reference can be made to U.S. Pat. Nos. 2,761,791, 2,941,898, 3,508, 947, and 3,526,528 and Yuji Harasaki, *Coating Kogaku*, p. 253, Asakura Shoten (1973).

The polarizing plate of the present invention comprises at least the antireflection film of the present invention.

Where the antireflection film according to the present invention is used as one of the protective layers of a polarizer to produce a polarizing plate, the side of the transparent substrate opposite to the antireflection layer (the low-refractive layer) side should be saponified with an alkali. Saponification with an alkali can be carried out according to either of the following procedures (1) and (2). The procedure (1) is superior in that it is conducted in the same processing step as with a general-purpose cellulose triacetate film. However, the procedure (1) involves disadvantages that not only the back side of the substrate but the antireflection layer side are hydrolyzed, which can result in deterioration of the antireflection layer and that the alkali treating solution remains on the antireflection layer to cause stains. In case such disadvantages are problematical, it is advisable to follow the procedure (2), which involves special steps.

(1) The transparent substrate having the low-refractive layer formed thereon is immersed in an alkali solution at least once to saponify the back side of the substrate.

(2) The side of the transparent substrate opposite to the side on which the low-refractive layer is to be formed is coated with an alkali solution either before or after formation of the low-refractive layer, and the coated substrate is heated and then washed with water and/or neutralized to saponify only the back side of the antireflection film.

Polarizers include iodine-based polarizers, dichroic dye polarizers, and polyene type polarizers. The iodine-based polarizers and the dichroic dye polarizers are usually prepared by dyeing a polyvinyl alcohol (PVA) film either before or after stretching. PVA prepared by saponifying polyvinyl acetate is generally used. Modified PVA is also useful. Dyeing of a PVA film can be carried out by an arbitrary means, for example, immersion in an iodine-potassium iodide aqueous solution or spread coating or spraying with an iodine solution or a dye solution. In stretching a PVA film, an additive for crosslinking PVA, such as a boric acid compound, is used preferably. It is preferred for the polarizing plate to have a transmittance of 30 to 50%, particularly 35 to 50%, at a wavelength of 550 nm, and a degree of polarization of 90 to 100%, particularly 95 to 100%, especially 99 to 100%, at a wavelength of 550 nm.

The polarizing plate having the antireflection film of the present invention on one side thereof as a protective film is fit for application to transmission, reflection or semi-transmission type LCDs in a TN mode, an STN mode, a VA mode, an IPS mode or an OCB mode. Where applied to transmission or semi-transmission type LCDs, the polarizing plate would secure higher visibility when combined with a commercially available brightness enhancing film, i.e., a polarizing beam splitting film having a polarized light selecting layer, for example, DBEF (dual brightness enhancement film) available from Sumitomo 3M Ltd. The polarizing plate can be combined with a quarter-wavelength plate to provide a surface protective plate for organic ELDs which serves to reduce reflected light from both the surface and the inside. The antireflection film of the invention which has a polyethylene terephthalate (PET) film or a polyethylene naphthalate (PEN) film as a transparent substrate is applicable to such image displays as PDPs and CRTs.

The present invention will now be illustrated in greater detail with reference to Examples, but it should be understood that the invention is by no means limited thereto. Unless otherwise noted, all the percents and parts are by weight.

(1) Preparation of Coating Composition A for Hard Coat Layer

In a mixed solvent consisting of 16 parts of methyl ethyl ketone and 220 parts of cyclohexanone was dissolved 306 parts of a dipentaerythritol pentaacrylate/dipentaerythritol hexaacrylate mixture Kayarad DPHA (available from Nippon Kayaku Co., Ltd.). To the solution was added 7.5 parts of a photopolymerization initiator Irgacure 907 (from Ciba-Geigy, Ltd.), and the mixture was stirred to dissolve the initiator. To the solution was added 450 parts of a silica sol dispersion in methyl ethyl ketone (MEK-ST, available from Nissan Chemical Industries, Ltd.; average particle size: 10 to 20 nm; solid content: 30%), followed by stirring. The resulting mixture was filtered through a polypropylene filter having a pore size of 3 $\mu$m (PPE-03) to prepare coating composition A for hard coat layer. On solvent removal and UV curing, coating composition A gave a film having a refractive index of 1.51.

(2) Preparation of Coating Composition B for Hard Coat Layer

A thousand parts of coating composition A for hard coat layer was mixed with 150 parts of crosslinked polystyrene particles SX-130H (from Soken Chemical & Engineering Co., Ltd.; average particle size: 1.3 $\mu$m; refractive index: 1.61). The mixture was uniformly dispersed by stirring in an air disper for 10 minutes and filtered through a polypropylene filter having a pore size of 3 $\mu$m (PPE-03) to prepare coating composition B for hard coat layer having a forward-scatter function.

(3) Preparation of Coating Composition C for Hard Coat Layer

In 52 parts of a 54/46 (by weight) mixture of methyl ethyl ketone and cyclohexanone were dissolved 91 parts of a dipentaerythritol pentaacrylate/dipentaerythritol hexaacrylate mixture Kayarad DPHA (from Nippon Kayaku) and 218 parts of a zirconia-containing UV-curing hard coat formulation DeSolite Z7401 (from JSR Corp.). To the resulting solution was added 10 parts of a photopolymerization initiator Irgacure 907 (from Ciba-Geigy). After stirring, the mixture was filtered through a polypropylene filter having a pore size of 3 $\mu$m (PPE-03) to prepare coating composition C for hard coat layer.

(4) Preparation of Titanium Dioxide Dispersion

Thirty parts of ultrafine titanium dioxide particles TTO-55B (from Ishihara Techno Corp.), 1 part of dimethylaminoethyl acrylate DMAEA (from KOHJIN Co., Ltd.), and 6 parts of a phosphoric acid radical-containing anionic dispersant KAYARAD PM-21 (from Nippon Kayaku) were dispersed in 63 parts of cyclohexanone in a sand grinder to prepare a titanium dioxide dispersion having an average particle size of 42 nm measured with a Coulter counter.

(5) Preparation of Coating Composition A for Medium-Refractive Layer

In a mixed solvent of 75 parts of cyclohexanone and 19 parts of methyl ethyl ketone were dissolved 0.11 part of a photopolymerization initiator Irgacure 907 (Ciba-Geigy Ltd.) and 0.04 part of a photosensitizer Kayacure DETX (Nippon Kayaku) To the solution were added 3.1 parts of the titanium dioxide dispersion prepared in (4) above and 2.1 parts of a dipentaerythritol pentaacrylate/dipentaerythritol hexaacrylate mixture Kayarad DPHA (Nippon Kayaku). The mixture was stirred at room temperature for 30 minutes, followed by filtration through a polypropylene filter having a pore size of 3 $\mu$m (PPE-03) to prepare coating composition A for medium-refractive layer.

(6) Preparation of Coating Composition B for Medium-Refractive Layer

In a mixed solvent of 750 parts of cyclohexanone and 190 parts of methyl ethyl ketone were dissolved 1.2 part of a photopolymerization initiator Irgacure 907 (Ciba-Geigy Ltd.) and 0.4 part of a photosensitizer Kayacure DETX (Nippon Kayaku) To the solution were added 105 parts of the titanium dioxide dispersion prepared in (4) above and 21 parts of a dipentaerythritol pentaacrylate/dipentaerythritol hexaacrylate mixture Kayarad DPHA (Nippon Kayaku). The mixture was stirred at room temperature for 30 minutes, followed by filtration through a polypropylene filter having a pore size of 3 μm (PPE-03) to prepare coating composition B for medium-refractive layer.

(7) Preparation of Coating Composition for High-Refractive Layer

In a mixed solvent of 54 parts of cyclohexanone and 18 parts of methyl ethyl ketone were dissolved 0.13 part of a photopolymerization initiator Irgacure 907 (Ciba-Geigy Ltd.) and 0.04 part of a photosensitizer Kayacure DETX (Nippon Kayaku) To the solution were added 26.4 parts of the titanium dioxide dispersion prepared in (4) above and 1.6 parts of a dipentaerythritol pentaacrylate/dipentaerythritol hexaacrylate mixture Kayarad DPHA (Nippon Kayaku). The mixture was stirred at room temperature for 30 minutes, followed by filtration through a polypropylene filter having a pore size of 3 μm (PPE-03) to prepare coating composition for high-refractive layer.

(8) Preparation of Coating Composition for Low-Refractive Layer

A 10% solution of a heat-crosslinkable fluorine-containing polymer in a mixed solvent consisting of 85% of methyl isobutyl ketone and 15% of 2-butanol was obtained by solvent exchange from a 6% methyl ethyl ketone solution of a heat-crosslinkable fluorine-containing polymer (JN-7228, from JSR; refractive index: 1.42). Seventy parts of the resulting polymer solution was mixed with 10 parts of a silica sol dispersion in methyl ethyl ketone MEK-ST (from Nissan Chemical; average particle size: 10 to 20 nm; solid content: 30%), 42 parts of methyl isobutyl ketone, and 28 parts of cyclohexanone. After stirring, the mixture was filtered through a polypropylene filter having a pore size of 3 μm (PPE-03) to prepare a coating composition for low-refractive layer.

EXAMPLE 1

Coating composition A for hard coat layer was applied to an 80 μm thick cellulose triacetate substrate TAC-TD80U (refractive index: 1.49, manufactured by Fuji Photo Film Co., Ltd.) with a gravure coater, dried at 100° C. for 2 minutes, and cured by irradiation with ultraviolet rays to form a hard coat layer having a thickness of 6 μm and a refractive index of 1.51.

Coating composition A for medium-refractive layer was applied to the hard coat layer with a gravure coater, dried at 100° C., and cured by UV irradiation to form a medium-refractive layer having a thickness of 67 nm and a refractive index of 1.63.

The coating composition for high-refractive layer was applied to the medium-refractive layer, dried at 100° C., and cured by UV irradiation to form a high-refractive layer having a thickness of 107 nm, a refractive index of 1.90 and a center-line average roughness (Ra) of 0.005 μm.

The coating composition for low-refractive layer was applied to the high-refractive layer with a gravure coater and heat-cured at 120° C. for 8 minutes to form a low-refractive layer having a thickness of 86 nm and a refractive index of 1.43. There was thus obtained an antireflection film of the invention.

The resulting antireflection film was evaluated according to the following methods. The results obtained are shown in Table 1.

(i) Specular Reflectance and Color of Reflected Light

A specular reflectance at an incidence angle (=reflection angle) of 5° in a wavelength region of 380 to 780 nm was measured with a spectrophotometer V-550 (from JASCO Corp.) equipped with an adapter ARV-474. The reflection spectrum obtained is shown in FIG. 1. An average reflectance in a range of from 450 to 650 nm was calculated to evaluate antireflection performance.

Further, the color of the specularly reflected light of CIE standard illuminant $D_{65}$ at an incidence angle of 5° was evaluated from a* and b* values of the CIE 1976 color space which were calculated from the reflection spectrum.

(ii) Pencil Hardness

A pencil hardness was measured as a parameter of scratch resistance in accordance with a pencil hardness testing method specified in JIS K-5400. The antireflection film was conditioned at a temperature of 25° C. and a humidity of 60% RH for 2 hours and then tested five times (n=5) using 2 H to 5 H pencils for evaluation specified in JIS S-6006 under a 500 g load. A film that received no scratches in four to five test runs was judged "OK", and a film that received scratches in three or more test runs was judged "NG". The highest pencil hardness against which a film was judged "OK" was taken as a hardness of that film.

(iii) Contact Angle

After the antireflection film was conditioned at 25° C. and 60% RH for 2 hours, a contact angle with pure water was measured as a parameter of contamination resistance.

(iv) Kinetic Friction Coefficient

A coefficient of kinetic friction was taken as an indication of surface slipperiness. After the antireflection film was conditioned at 25° C. and 60% RH for 2 hours, a kinetic friction coefficient was measured with a kinetic friction tester Heidon-14 using a stainless ball of 5 mm in diameter under a 100 g load at a speed of 60 cm/min.

COMPARATIVE EXAMPLE 1

Figure 9:
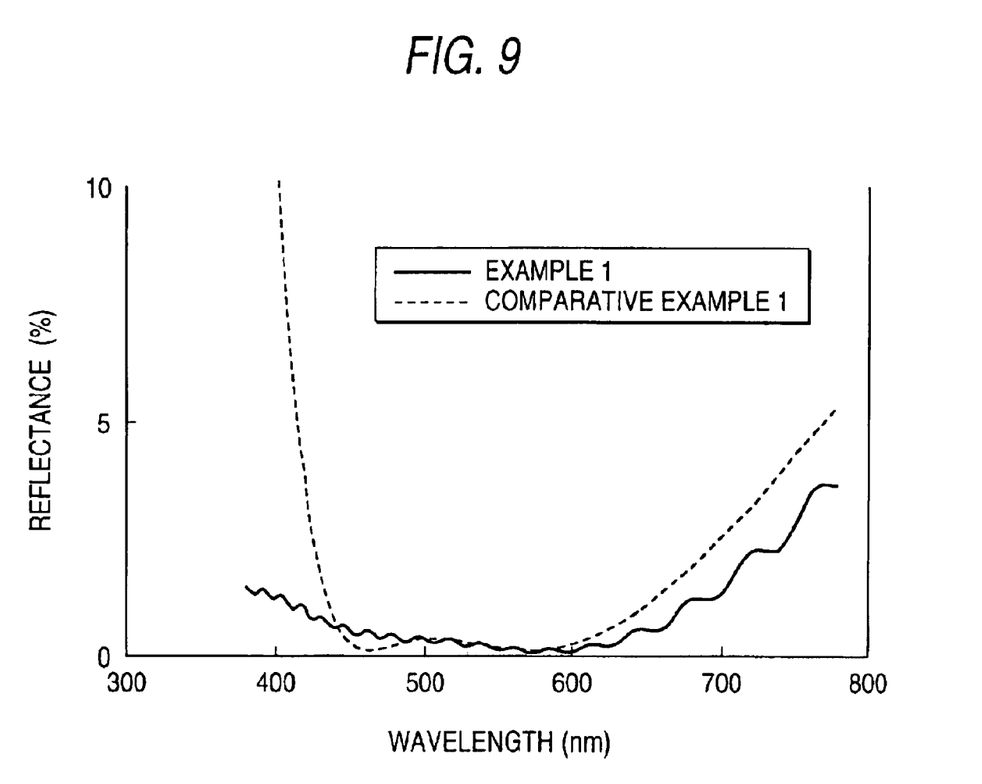
FIG. 9 shows the reflection spectrum of the antireflection films prepared in Example 1 and Comparative Example 1 in a wavelength region of 380 to 780 nm.

A transparent substrate with a hard coat layer was prepared in the same manner as in Example 1. On the hard coat layer were deposited by physical vapor deposition a 25 nm thick titanium oxide layer (refractive index: 1.39) and a 25 nm thick silicon oxide layer (refractive index: 1.47) to form a substantially medium-refractive layer. On the medium-refractive layer were further deposited a 46 nm thick titanium oxide layer as a high-refractive layer and a 97 nm thick silicon oxide layer as a low-refractive layer. The resulting antireflection film was evaluated in the same manner as in Example 1. The results obtained are shown in Table 1. The reflection spectrum of the antireflection film is shown in FIG. 9.

EXAMPLE 2

The antireflection film prepared in Example 1 was immersed in a 2.0N aqueous solution of sodium hydroxide at 55° C. for 2 minutes to saponify the back side of the cellulose triacetate substrate. The saponified substrate side of the antireflection film was adhered to a side of a stretched PVA film having adsorbed iodine (polarizer). A 80 μm thick cellulose triacetate film TAC-TD80U (from Fuji Photo Film) having been saponified in the same manner as described above was adhered to the other side of the polarizer to prepare a polarizing plate.

The polarizing plate was used to assemble a transmission type TN mode LCD mounted on a notebook computer. The LCD has a polarizing beam splitting film having a polarized light selecting layer DBEF (Sumitomo 3M) between a backlight and a liquid crystal cell. The polarizing plate was adhered to the viewer's side of the cell with its antireflection layer as the outermost surface. The LCD exhibited very high display quality with little reflection of a viewer's background.

EXAMPLE 3

A polarizing plate was prepared in the same manner as in Example 2, except that the back side of the substrate of the antireflection film prepared in Example 1 was coated with a 1.0N aqueous solution of potassium hydroxide with a #3 bar, heated at 60° C. (film surface temperature) for 10 seconds, washed with water, and dried. The resulting polarizing plate was assembled into an LCD in the same manner as in Example 2. The LCD exhibited very high display quality.

EXAMPLE 4

The protective film on the liquid crystal cell side of the polarizing plate prepared in Example 3, which was disposed on the viewer's side of the cell, and the protective film on the cell side of the polarizing plate disposed on the backlight side were replaced with a viewing angle widening film Wide View Film SA-12B (from Fuji Photo Film). Wide View Film SA-12B has an optical compensation layer made of a compound having a discotic structural unit tilted with respect to the plane of the transparent substrate at a tilting angle varying in the thickness direction of the optical compensation layer. The resulting LCD exhibited extremely excellent visibility and high display quality with good contrast in a bright room and a much widened viewing angle in both horizontal and vertical directions.

EXAMPLE 5

An antireflection film having a forward-scatter function was prepared in the same manner as in Example 1, except for using coating composition B for hard coat layer in place of the coating composition A for hard coat layer. A transmission type TN mode LCD was assembled by disposing the resulting forward-scattering antireflection film as an outermost layer (viewer's side) and disposing a viewing angle widening film Wide View Film WV-12A (from Fuji Photo Film) on the liquid crystal cell side. The LCD was markedly excellent in visibility and display quality, showing improvement over Example 4 in that the critical viewing angle at which contrast reversal occurs when the display screen is tilted downward was increased from 40° to 60°.

EXAMPLE 6

The antireflection film prepared in Example 1 was adhered with a pressure-sensitive adhesive to the glass faceplate of an organic ELD. As a result, the reflection on the glass was suppressed to secure high visibility.

EXAMPLE 7

A quarter-wavelength plate was adhered to the polarizing plate prepared in Example 3 on the side opposite to the antireflection film side. The polarizing plate was adhered to the glass faceplate of an organic ELD with the antireflection film side outside. As a result, both the surface reflection and the reflection from the inside of the glass plate were cut to provide extremely high visibility.

EXAMPLE 8

Coating composition C for hard coat layer was applied to the primer-coated side of a PET film having a thickness of 188 µm (CosmoshineA4100, the refractive index: 1.65, available from Teijin Ltd.), dried, and UV-cured in the same manner as in Example 1 to form a hard coat layer having a thickness of 8 µm and a refractive index of 1.61.

Coating composition B for medium-refractive layer was applied to the hard coat layer with a gravure coater, dried at 100° C., and cured by UV irradiation to form a medium-refractive layer having a thickness of 70 nm and a refractive index of 1.70.

The coating composition for high-refractive layer was applied to the medium-refractive layer, dried at 100° C., and UV-cured to form a high-refractive layer having a thickness of 120 nm and a refractive index of 1.90.

The coating composition for low-refractive layer was applied to the high-refractive layer with a gravure coater and heat-cured at 120° C. for 8 minutes to form a low-refractive layer having a thickness of 90 nm and a refractive index of 1.43. There was thus obtained an antireflection film of the invention.

The resulting antireflection film was evaluated in the same manner as in Example 1. The results obtained are shown in Table 1. It is seen that the antireflection film markedly reduces coloring of reflected light and has very high pencil hardness. A flat CRT and a PDP having the resulting antireflection film adhered to their faceplate satisfied all the requirements for low reflection, reduced coloring of reflected light, and high hardness.

TABLE 1

| | Average Reflectance (%) | Reflected Light Color (a*/b*) | Kinetic Friction Coefficient | Pure Water Contact Angle (°) | Pencil Hardness |
|---|---|---|---|---|---|
| Example 1 | 0.28 | 2/−6 | 0.08 | 103 | 3 H |
| Example 8 | 0.40 | 2/−5 | 0.08 | 103 | 4 H |
| Compara. Example 1 | 0.33 | 9/−10 | 0.20 | 40 | 2 H |

The antireflection film of Example 1 achieves very favorable reflection characteristics, i.e., low reflection and reduction of reflected light coloration. Besides, it has a small coefficient of kinetic-friction that assures scratch resistance, a large contact angle with pure water that means repellency to water and oil, assuring anticontamination properties, and a high pencil hardness that assures scratch resistance.

The comparative antireflection film provides reddish purple-colored reflected light which deteriorates display quality, has a high kinetic friction coefficient meaning poor scratch resistance, and a small pure water contact angle meaning poor anticontamination properties.

EXAMPLE 9

(1) Preparation of Coating Composition for Medium-Refractive Layer

In a mixed solvent of 153 g of cyclohexanone and 37 g of methyl ethyl ketone were dissolved 0.14 g of a photopolymerization initiator Irgacure 907 (Ciba-Geigy Ltd.) and 0.04 g of a photosensitizer Kayacure DETX (Nippon Kayaku) To the solution were added 6.2 g of the titanium dioxide dispersion prepared as set forth below and 2.4 g of a dipentaerythritol pentaacrylate/dipentaerythritol hexaacrylate mixture Kayarad DPHA (Nippon Kayaku). The mixture was stirred at room temperature for 30 minutes, followed by filtration through a polypropylene filter having a pore size of 1 µm to prepare a coating composition for medium-refractive layer.

(Preparation of the Titanium Dioxide Dispersion)

Thirty parts of titanium dioxide (weight average primary particle size: 50 nm; refractive index: 2.70), 5.0 parts of an anionic diacrylate monomer PM12 (from Nippon Kayaku), and 0.2 part of a cationic methacrylate monomer DMAEA (from KOHJIN Co., Ltd.) were dispersed in 65.2 parts of methyl ethyl ketone in a sand grinder to prepare a titanium dioxide dispersion.

(2) Preparation of Antireflection Film

The coating composition for hard coat layer prepared as set forth below was applied to an 80 μm thick cellulose triacetate substrate having a refractive index of 1.48 with a bar coater, dried at 120° C., and cured by irradiation with 300 mJ/cm$^2$ of ultraviolet rays at an illuminance of 400 mW/cm$^2$ by use of a 160 W/cm air-cooled metal halide lamp (from Eye Graphics) to form a 6 μm thick hard coat. The hard coat layer had a refractive index of 1.53.

(Preparation of Coating Composition for Hard Coat Layer)

In 400 g of a 1:1 (by weight) mixture of methyl ethyl ketone and cyclohexanone was dissolved 347 g of a silica-containing UV-curing hard coat formulation DeSolite KZ7526 (from JSR; solid content: 72%; silica content: 38%; average particle size: 20 nm). After stirring, the mixture was filtered through a polypropylene filter having a pore size of 1 μm to prepare a coating composition for hard coat layer.

The coating composition for medium-refractive layer prepared in (1) above was applied to the hard coat layer with a bar coater, dried at 120° C., and cured by irradiation with 300 mJ/cm$^2$ of ultraviolet rays at an illuminance of 400 mW/cm$^2$ by use of a 160 W/cm air-cooled metal halide lamp (from Eye Graphics) to form a medium-refractive layer having a thickness of 0.065 μm. The medium-refractive layer had a refractive index of 1.63.

The coating composition for high-refractive layer prepared as set forth below was applied to the medium-refractive coat layer with a bar coater, dried at 120° C., and cured by irradiation with 300 mJ/cm$^2$ of ultraviolet rays at an illuminance of 400 mW/cm$^2$ by use of a 160 W/cm air-cooled metal halide lamp (from Eye Graphics) to form a high-refractive layer having a thickness of 0.105 μm. The high-refractive layer had a refractive index of 1.90.

(Preparation of Coating Composition for High-Refractive Layer)

In a mixed solvent of 125.2 g of cyclohexanone and 37.2 g of methyl ethyl ketone were dissolved 0.07 g of a photopolymerization initiator Irgacure 907 (from Ciba-Geigy Ltd.) and 0.02 g of a photosensitizer Kayacure DETX (from Nippon Kayaku). To the solution were added 13.4 g of the titanium dioxide dispersion prepared in (1) above and 0.76 g of a dipentaerythritol pentaacrylate/dipentaerythritol hexaacrylate mixture Kayarad DPHA (from Nippon Kayaku). The mixture was stirred at room temperature for 40 minutes, followed by filtration through a polypropylene filter having a pore size of 1 μm to prepare a coating composition for high-refractive layer.

The coating composition for adhesive layer and the coating composition for low-refractive layer prepared as set forth below were applied to the high-refractive layer in the same manner as set forth below to prepare an antireflection film. The adhesive layer had a refractive index of 1.50, an Ra of 0.006 μm and avoid volume of 10 vol %. The low-refractive layer had a refractive index of 1.43, a water contact angle of 103°, and a kinetic friction coefficient of 0.04.

(Preparation of Coating Composition for Adhesive Layer)

Two hundred grams of a methanol dispersion of silica particles having an average particle size of 15 nm (methanol silica sol available from Nissan Chemical Industries, Ltd.; solids content: 30%) were mixed with 3 g of a silane coupling agent KBM-503 (from Shin-Etsu Silicone Co., Ltd.) and 2 g of 1N hydrochloric acid, and the mixture was stirred at room temperature for 5 hours and allowed to stand still for 3 days to prepare a silane coupling-treated silica dispersion.

To 35.04 g of the dispersion were added 58.35 g of isopropylalcohol and 39.34 g of diacetonealcohol. Separately, 1.02 g of a photopolymerization initiator Irgacure 907 (from Ciba-Geigy Ltd.) and 0.51 g of a photosensitizer Kayacure DETX (from Nippon Kayaku Co., Ltd.) were dissolved in 772.85 g of isopropyl alcohol, and 25.6 g of a dipentaerythritol pentaacrylate/dipentaerythritol hexaacrylate mixture Kayarad DPHA (from Nippon Kayaku) was dissolved therein. The resulting solution (67.23 g) was added to the mixture of the silica dispersion, isopropyl alcohol and diacetone alcohol. The mixture was stirred at room temperature for 20 minutes and filtered through a polypropylene filter having a pore size of 1 μm to prepare a coating composition for adhesive layer. The proportion of the inorganic particles in the total solids content was 83%.

(Preparation of Coating Composition for Low-Refractive Layer)

To 210 g of a heat-crosslinkable fluorine-containing polymer JN-7228 (available from JSR Corp.; refractive index: 1.42; solid content: 6%) were added 18 g of a silica sol dispersion in methyl ethyl ketone (MEK-ST, available from Nissan Chemical Industries, Ltd.; average particle size: 10 to 20 nm; solid content: 30%) and 200 g of methyl ethyl ketone. After stirring, the mixture was filtered through a polypropylene filter having a pore size of 1 μm to prepare a coating composition for low-refractive layer.

(Coating)

The coating composition for adhesive layer was applied to the high-refractive layer with a bar coater, dried at 80° C. for 5 minutes, and cured by irradiation with 300 mJ/cm$^2$ of ultraviolet rays at an illuminance of 400 mW/cm$^2$ by use of a 160 W/cm air-cooled metal halide lamp (from Eye Graphics Co., Ltd.) to form an adhesive layer having a thickness of 0.03 μm.

The coating composition for low-refractive layer was applied to the adhesive layer with a bar coater, dried at 80° C. for 5 minutes, and cured by heating at 120° C. for 10 minutes to form a low-refractive layer having a thickness of 0.06 μm.

Evaluation:

In the present invention, the adhesive layer was evaluated as follows.

(a) Center-Line Average Roughness (Ra)

Ra was measured in accordance with JIS B0601. The surface profile in an area of 10 μm-square was measured with an atomic force microscope SPA-400, supplied by Seiko Instruments, Inc., over an assessment length of 4 μm. Arbitrarily selected three profiles were analyzed to obtain an Ra.

(b) Void Volume

The void volume was calculated by attributing the difference between the measured refractive index of an adhesive layer (calculated from the minimum reflectance) and that calculated based on the composition of the adhesive layer to air (refractive index: 1.00) contained in the adhesive layer.

The antireflection films prepared in Examples and Comparative Examples were evaluated as follows.

(c) Specular Reflectance

A specular reflectance at an incidence angle (=reflection angle) of 5° in a wavelength region of 380 to 780 nm was measured with a spectrophotometer V-550 (from JASCO Corp.) equipped with an adapter ARV-474. An average reflectance between 450 nm and 650 nm was calculated to evaluate antireflection performance.

(d) Haze

The haze of the antireflection film was measured with a haze meter Model 1001DP from Nippon Denshoku Industries Co., Ltd.

(e) Pencil Hardness

A pencil hardness was measured as a parameter of scratch resistance in accordance with a pencil hardness testing method specified in JIS K-5400. The antireflection film was conditioned at a temperature of 25° C. and a humidity of 60% RH for 2 hours and then tested five times using a 3H pencil for evaluation specified in JIS S-6006 under a 1 kg load. A film that received no scratches in three or more out of five test runs was regarded to have a pencil hardness of 3 H.

(f) Scratch Resistance

The antireflection film was given 10 double rubs with a grade #0000 steel wool pad having a contact area equivalent to a 10-yen coin under a load of 400 g. The scratch resistance was graded on the following 3-grade scale.

A . . . No scratches resulted.

B . . . Slight and hardly perceptible scratches resulted.

C . . . Considerable scratches resulted.

(g) Antiglare Performance

A bare fluorescent tube (8000 cd/m$^2$) was reflected on the antireflection film. The degree of blur of the reflected image was graded as follows.

A . . . The outline of the image is not at all recognizable.

B . . . The outline of the image is slightly recognizable.

C . . . The image is blurred, but the outline I distinguishable.

D . . . The image is clear with no substantial blur.

(h) Contact Angle

After the antireflection film was conditioned at 25° C. and 60% RH for 2 hours, a contact angle with water was measured as a parameter of contamination resistance.

(i) Kinetic Friction Coefficient

A coefficient of kinetic friction was taken as an indication of surface slipperiness. After the antireflection film was conditioned at 25° C. and 60% RH f or 2 hours, a kinetic friction coefficient was measured with a kinetic friction tester Heidon-14 using a stainless ball of 5 mm in diameter under a 100 g load at a speed of 60 cm/min.

The results of measurement and evaluation are shown in Table 2 below. In the antireflection film of Example 9, the color of the regular reflection light of CIE standard illuminant $D_{65}$ as set forth above was evaluated, a* and b* values is 0 and −7, respectively.

It is seen from Table 2 that the antireflection film of Examples 9 was excellent in scratch resistance and other performance attributes.

TABLE 1

| | Reflectance (%) | Haze (%) | Pencil Hardness | Scratch Resistance |
|---|---|---|---|---|
| Example 9 | 0.33 | 0.2 | 3 H | A |

EXAMPLE 10

The antireflection film prepared in Example 9 was subjected to saponification. The saponified antireflection film and a cellulose triacetate substrate were adhered to the respective sides of a stretched PVA film having adsorbed iodine with a PVA pressure-sensitive adhesive to prepare a polarizing plate. An LCD was prepared by using the polarizing plate with its antireflection layer as an outermost layer. The display exhibited excellent visibility with reduced reflection of light rays from outside sources.

EXAMPLE 11

Antireflection films were prepared in the same manner as in Examples 9 and 10, except for changing the thickness of the cellulose triacetate substrate to 50 μm. The resulting antireflection films were equivalent to those of Examples 9 and 10 in reflectance, haze, scratch resistance, and antiglare performance. Similarly, antireflection films were prepared by using cellulose acylate film sample 101 used in Example 1 of Technical Disclosure Bulletin 2001-1745. The resulting antireflection films were equivalent to those of Examples 9 and 10 in reflectance, haze, scratch resistance, and antiglare performance.

EXAMPLE 12

A mobile phone with a semi-transmission type LCD was assembled. The LCD had the polarizing plate with an antireflection layer prepared in Example 3 as an outermost layer. The antireflection film prepared in Example 1 was adhered to each side of an acrylic resin plate via a pressure-sensitive adhesive, and the acrylic resin plate was disposed on the polarizing plate as a faceplate. The display exhibited high visibility, not being inferior to an antireflection LCD having no faceplate.

Further, LCDs for a mobile phone were prepared; one with the antireflection film of Example 1 adhered to only the inner side of the faceplate, one with no antireflection film on either side of the faceplate, and one in which neither the faceplate nor the liquid crystal cell had an antireflection coat. It was found as a result that visibility deteriorated as the number of antireflection films disposed is decreased and that the LCD with no antireflection film completely lost visibility of letters where a fluorescent tube, etc. were reflected.

EXAMPLE 13

A polarizing plate was prepared in the same manner as in Example 2, except for replacing the polarizer used in Example 2 with a polarizer prepared as described below. The resulting polarizing plate was equal in antireflection performance to that of Example 1. Because the absorption axes of the stock roll of the polarizer formed an angle of 45° with the longitudinal direction, production of waste in die-stamping the polarizing plate to various sizes was reduced.

Preparation of Polarizer:

A PVA film was immersed in an aqueous solution containing 5.0 g/l of iodine and 10.0 g/l of potassium iodide at 25° C. for 90 seconds and then in a 10 g/l aqueous solution of boric acid at 25° C. for 60 seconds. The PVA film was stretched 7.0 times in the transverse direction by means of a tenter type stretching machine of the type shown in FIG. 2 of U.S. patent application Ser. No. 2002-8,840A1 and then let to shrink to a stretch ratio of 5.3. With this width fixed, the stretched film was dried at 70° C. and released from the tenter. The difference in running speed between the left and the right tenter clips was less than 0.05%. The angle made by the center line of the film introduced into the tenter and that of the film sent to the subsequent step was 0°. The difference |L1−L2| and the width W (see FIG. 2 of the Ser. No. 2002-8,840A1) were both 0.7 m. No wrinkles nor film deformation was observed at the outlet of the tenter. The transmittance at 550 nm was 43.3%, and the degree of polarization was 99.98%.

INDUSTRIAL APPLICABILITY

Having an average reflectance of 0.4% or less in a wavelength region of 450 to 650 nm, the antireflection film of the present invention highly prevents reduction of visibility due to reflection when applied to an LCD. The specularly reflected light of CIE standard illuminant $D_{65}$ on the antireflection film at an incidence angle of 5° between 380 nm and 780 nm has a color within ranges of $-7 \leq a^* \leq 7$ and $-10 \leq b^* \leq 10$ according to CIE 1976 L*a*b* color space system. Therefore, the reflected light, not being colored in reddish purple or bluish purple, does not impair display quality even when light sources of high brightness, such as fluorescent tubes, behind a viewer are reflected on the display screen.

The antireflection film of the invention finds various applications in image displays as, for example, a polarizing plate in LCDs of various modes, a surface protective plate (a polarizing plate combined with a quarter-wavelength plate) in organic ELDs, and a surface protective plate having a PET film substrate for use in flat CRTs or PDPs.

What is claimed is:

1. An antireflection film comprising:

a transparent substrate; and a low-refractive layer having a lower refractive index than said transparent substrate, wherein the antireflection film has an average specular reflectance of 0.5% or less at an incidence angle of 5° in a wavelength region of from 450 to 650 nm, and, when CIE standard illuminant $D_{65}$ in a wavelength region of from 380 to 780 nm is incident on the antireflection film at an incidence angle of 5°, the regular reflection light has a color having a* and b* values in a ranges specified by $-7 \leq a^* \leq 7$ and $-10 \leq b^* \leq 10$ in the CIE 1976 L*a*b* color space.

2. The antireflection film according to claim 1, wherein said regular reflection light has a* and b* values in the ranges specified by $0 \leq a^* \leq 5$ and $-10 \leq b^* \leq 10$.

3. The antireflection film according to claim 1, wherein said average specular reflectance at an incidence angle of 5° in a wavelength region of from 450 to 650 nm is 0.4% or less.

4. The antireflection film according to claim 1, wherein said average specular reflectance at an incidence angle of 5° in a wavelength region of from 450 to 650 nm is 0.3% or less.

5. The antireflection film according to claim 1, which further comprises an adhesive layer which is in contact with the lower side of said low-refractive layer, wherein a surface of said adhesive layer has a center-line average roughness (Ra) of 0.001 to 0.030 μm.

6. The antireflection film according to claim 5, wherein the surface of said adhesive layer has a center-line average roughness (Ra) of 0.005 to 0.020 μm.

7. The antireflection film according to claim 5, which further comprises a hard coat layer having a thickness of 1 μm or greater between said adhesive layer and said transparent substrate, wherein said adhesive layer is an adhesive and high-refractive layer having a higher refractive index than said transparent substrate.

8. The antireflection film according to claim 7, which further comprises a medium-refractive layer between said adhesive and high-refractive layer and said hard coat layer, wherein said medium-refractive layer has a refractive index higher than that of said low-refractive layer and lower than that of said adhesive and high-refractive layer.

9. The antireflection film according to claim 5, wherein said low-refractive layer includes a fluorine-containing compound capable of crosslinking by one of a heat and an irradiation with an ionizing radiation, and said low-refractive layer has: a refractive index of 1.35 to 1.49; a kinetic friction coefficient of 0.03 to 0.15; and a contact angle of 90 to 120° with water.

10. A polarizing plate having the antireflection film described in claim 5 on at least one side thereof.

11. An apparatus for displaying an image, comprising the antireflection film described in claim 5.

12. The apparatus for displaying an image according to claim 11, wherein the antireflection film is provided so that the low-refractive layer is the outermost layer of the display.

13. The antireflection film according to claim 1, wherein a layer constituting said antireflection film is a layer formed by applying a coating composition comprising a film-forming solute and at least one solvent, drying the coating film to remove the solvent, and curing the coating film by applying at least one of a heat and an ionizing radiation.

14. The antireflection film according to claim 13, which has a substantially three-layered structure comprising a medium-refractive layer, a high-refractive layer, and said low-refractive layer, in the order from the substrate side, wherein the high-refractive layer has a higher refractive index than said transparent substrate, and the medium-refractive layer has a refractive index higher than that of said transparent substrate and lower than that of said high-refractive layer.

15. The antireflection film according to claim 14, wherein said medium-refractive layer, said high-refractive layer, and said low-refractive layer satisfy formulae (I), (II), and (III), respectively, at a designed wavelength λ (=500 nm):

$$l\lambda/4 \times 0.80 < n_1 d_1 < l\lambda/4 \times 1.00 \quad (I)$$

$$m\lambda/4 \times 0.75 < n_2 d_2 < m\lambda/4 \times 0.95 \quad (II)$$

$$n\lambda/4 \times 0.95 < n_3 d_3 < n\lambda/4 \times 1.05 \quad (III)$$

wherein l is 1; $n_1$ is the refractive index of the medium-refractive layer; $d_1$ is the thickness (nm) of the medium-refractive layer; m is 2; $n_2$ is the refractive index of the high-refractive layer; $d_2$ is the thickness (nm) of the high-refractive layer; n is 1; $n_3$ is the refractive index of the low-refractive layer; $d_3$ is the thickness (nm) of the low-refractive layer.

16. The antireflection film according to claim 13, wherein said low-refractive layer comprises a fluorine-containing resin capable of curing by at least one of a heat and an irradiation of an ionizing radiation.

17. The antireflection film according to claim 16, wherein said low-refractive layer has a kinetic friction coefficient of 0.15 or smaller and a contact angle of 100° or greater with water.

18. The antireflection film according to claim 13, wherein said high-refractive layer is a layer formed by:

applying a coating composition comprising:

ultrafine particles containing-at least one metal oxide selected from oxides of titanium, zirconium, indium, zinc, tin and antimony;

an anionic dispersant;

a curing resin having at least three-functional polymerizable group;

a polymerization initiator; and a solvent, drying the coating film to remove the solvent; and curing the coating film by applying at least one of a heat and an ionizing radiation.

19. The antireflection film according to claim 1, which further comprises at least one hard coat layer between said low-refractive layer and said transparent substrate.

20. The antireflection film according to claim 1, which further comprises at least one forward-scattering layer between said low-refractive layer and said transparent substrate.

21. The antireflection film according to claim 1, wherein, when CIE standard illuminant $D_{65}$ in a wavelength region of from 380 to 780 nm is incident on the antireflection film at an incidence angle of 5°, the regular reflection light shows a color difference of less than 2 in terms of a $\Delta Eab^*$ value in the CIE 1976 $L^*a^*b^*$ color space between two arbitrary points 10 cm apart in one of the machine direction (MD) and the transverse direction (TD).

22. A polarizing plate comprising a polarizer and at least two surface protective films, in which each of the at least two protective films is adhered to both sides of said polarizer, wherein at least one of said protective films is the antireflection film described in claim 1, said antireflection film having been immersed in an alkali solution at least once to saponify the back surface of said antireflection film after the formation of the low-refractive layer.

23. A polarizing plate according to claim 22, wherein the surface protective film other than the antireflection film is an optical compensation film having, on the side opposite to said polarizer, an optical compensation layer comprising an optically an isotropic layer, said optically anisotropic layer being a negative birefringence layer comprising a compound having a discotic structural unit, in which the disc of said discotic structural unit tilts with respect to the plane of said protective film at an angle varying in the thickness direction of said optically anisotropic layer.

24. A transmission, reflection or semi-transmission type liquid crystal display in a twisted nematic mode, a supertwisted nematic mode, a vertical alignment mode, an in-plane switching mode or an optical compensated bend cell mode, which comprises at least one polarizing plate described in claim 22.

25. A transmission or semi-transmission type liquid crystal display, which comprises at least one polarizing plate described in claim 22, wherein a polarized light splitting film having a polarized light selecting layer is disposed between a backlight and a polarizing plate which is disposed on the opposite side to the viewer's side.

26. A surface protective plate for an organic electroluminescence display, which comprises the polarizing plate described in claim 22 and a λ/4 plate, wherein the λ/4 plate is disposed on a transparent protective film opposite to the antireflection film side.

27. A polarizing plate comprising a polarizer and at least two surface protective films, in which each of at least two protective films is adhered to both sides of said polarizer, wherein at least one of said protective films is the antireflection film described in claim 1, said antireflection film being prepared by: coating the back side of the antireflection film opposite to the side on which the low-refractive layer is to be formed with an alkali solution, either before or after formation of said low-refractive layer; heating said coated antireflection film, followed by at least one of washing with water and a neutralization thereby to saponify only the back side of said antireflection film.

28. The antireflection film according to claim 1, wherein said transparent substrate is one of a polyethylene terephthalate film, a polyethylene naphthalate film and a cellulose triacetate film.

* * * * *